3,406,156
REGENERATION OF HYDROGENATION
CATALYSTS
Clyde Lee Aldridge and John Dana Koontz, Baton Rouge, La., assignors to Esso Research and Engineering Company, a corporation of Delaware
No Drawing. Filed Jan. 20, 1964, Ser. No. 338,612
6 Claims. (Cl. 260—82)

This invention relates to a method for regenerating catalysts and more particularly relates to a method for regenerating hydrogenation catalysts and still more particularly to catalysts used for the hydrogenation of resins obtained by the polymerization of cracked petroleum fractions.

It is known to prepare resins from steam-cracked petroleum fractions by Friedel-Crafts polymerization at low temperatures and to hydrogenate the resulting product over a hydrogenation catalyst in the presence of a hydrocarbon solvent. The hydrogenation converts an otherwise highly colored and, thus for many uses, an undesirable product, into a low-colored commercially attractive product. However, the catalyst used for the hydrogenation becomes less active as the reaction continues and in a continuous process this is evidenced by a gradual increase in the color of the hydrogenated product.

In accordance with the present invention it has now been discovered that the catalyst can be regenerated by periodically washing it with an aromatic hydrocarbon solvent. This washing step is performed as soon as the color of the hydrogenated resin reaches a point higher than that which can be tolerated commercially.

The base resin which is to be hydrogenated is prepared by known methods from cracked petroleum fractions. In a preferred method of operating, a steam-cracked naphtha fraction boiling within about 50 to 450° F. having the following approximate composition:

| | Wt. percent |
|---|---|
| Benzene | 5–15 |
| Toluene | 5–10 |
| Higher aromatic hydrocarbons | 5–30 |
| Cyclic diolefins | 5–15 |
| Cyclic mono-olefins | 5–10 |
| Aliphatic diolefins | 10–15 |
| Aliphatic mono-olefins | 10–30 |
| Paraffins | 0–5 | is prepared by steam-cracking a selected petroleum fraction.

This fraction may be subjected as it is to polymerization in the presence of a Friedel-Crafts catalyst, such as $AlCl_3$, $BF_3$, $SnCl_4$, $TiCl_4$, $AlBr_3$, etc. at a temperature of about −150° F. to +200° F., preferably 70 to 130° F. Although it is not required, insofar as the subsequent steps of the process are concerned, it may be desirable for certain end uses to remove the cyclic dienes from the steam-cracked fraction. This is conveniently done by heating the fraction at a temperature of about 180° F. to 240° F. for a time sufficient to dimerize the cyclodienes which are then separated by distillation.

The effluent from the polymerization reaction, with or without the dienes is stripped to remove the unreacted components, care being taken that at least 80% and preferably all of the aromatic hydrocarbons be removed. Care should also be taken not to heat the product to a temperature higher than 320° F. in order to avoid resin degradation which results in difficulties in the subsequent hydrogenation step. Stripping the resin to remove at least 80%, preferably 90% or more, of the aromatic hydrocarbons remaining in the unreacted material, but without heating the solution to a temperature above 320° F., has been found to be suitable to accomplish the desired results.

The stripped resin is then dissolved in a substantially aliphatic hydrocarbon solvent and submitted to a continuous hydrogenation process. Care should again be taken not to heat the resin solution above 320° F. prior to contacting the catalyst and hydrogen. It can conveniently be brought to reaction temperature without harm by heating it to 300° F. and then dissolving it in an aliphatic hydrocarbon solvent which has been heated to a temperature high enough so that the resulting solution is at reaction temperature. The solution is then immediately contacted with the hydrogenation catalyst in the presence of hydrogen for a time sufficient to yield a low-colored resin.

Suitable aliphatic solvents for use in the hydrogenation step include n-hexane and its various isomers, n-heptane and the like.

Suitable hydrogenation catalysts include metals of Groups VI and VIII of the periodic table, e.g. nickel, palladium, platinum, nickel sulfides, copper chromite, cobalt molybdate, etc. which may be supported on light porous or granular particles of large surface area such as alumina, pumice, clay, charcoal, etc.

The hydrogenation is effected under a pressure of about 100 to 5000 p.s.i.g., preferably about 500 to 3000 p.s.i.g., at temperatures of 100–750° F., preferably about 300 to 500° F. under a hydrogen flow rate of about 100 to 2000 standard cubic feet per barrel of resin with a liquid feed rate of 0.1 to 5, preferably 1 to 2 v./v./hr., i.e. volumes of liquid feed per volume of catalyst per hour.

As the hydrogenation proceeds, the catalyst loses its activity as evidenced by a steady increase in the color of the hydrogenated resin produced. In accordance with this invention it has been found that the catalyst can be restored to its previous activity by stopping the flow of resin feed and introducing an aromatic hydrocarbon, such as benzene, toluene, xylene, Solvesso 100 (an aromatic hydrocarbon fraction boiling from 322 to 351° F.), Solvesso 150 (an aromatic hydrocarbon fraction boiling 374° to 410° F.) and the like while maintaining the other conditions substantially the same. This treatment is continued for one to several hours or as long as necessary to restore activity. The flow of aromatic hydrocarbon is then discontinued and the resin feed again introduced and hydrogenation continued until the catalyst activity again needs restoring at which time the aromatic hydrocarbon is again introduced. This washing step is found to be necessary every four to twelve days. Aliphatic hydrocarbons will not restore the activity of the catalyst.

The hydrogenated resin may be either stored and shipped as such or it may be subjected to stripping under low pressure, e.g. steam stripping or vacuum stripping to remove the volatile solvents as well as any low-boiling oil present. The resulting resin has a Gardner color of less than 2, generally averages about 1 to 1.5. It has a softening point of 200 to 250° °F., a bromine number below 20 (generally below 10) and has a molecular weight of about 500 to 3000, generally about 1000 to 2000.

3

The advantages and details of the invention will be better understood from the following specific examples.

Example 1

Run A.—The feed or raw material which was subjected to polymerization was made by steam-cracking a gas oil petroleum fraction derived from a paraffinic type crude, the cracking being carried out at a temperature of about 1300–1450° F. and pressure of 5 to 20 p.s.i.g. in the presence of about 70 to 80 mol percent of steam.

The approximate analysis of the resultant steam-cracked fraction, after debutanizing, was as follows:

| | Volume percent |
|---|---|
| $C_5$ cyclodiolefins | 5 |
| Aliphatic $C_5$ diolefins | 5 |
| $C_5$ olefins | 20–21 |
| $C_{6-8}$ diolefins | 8–10 |
| $C_{6-8}$ olefins | 14–15 |
| $C_{9-12}$ diolefins | 3 |
| $C_{9-12}$ olefins | 4 |
| Benzene | 15 |
| Toluene | 10 |
| Xylenes | 2–3 |
| $C_{9-12}$ aromatics | 5–6 |
| Paraffins | 3 |

The above steam-cracked fraction was subjected to heat soaking and distillation to remove pentenes, isoprene, and cyclodienes.

The resulting feed had this approximate analysis:

| | Volume percent |
|---|---|
| Pentenes | 4 |
| Isoprene | 2 |
| Piperylenes | 8 |
| Acetylenes | 1 |
| Cyclodienes | 2 |
| Benzene | 40 |
| Toluene | 10 |
| $C_6$–$C_8$ diolefins | 13 |
| $C_6$–$C_8$ olefins | 20 |

The product was subjected to Friedel-Crafts continuous polymerization at a temperature of 90–120° F. for a residence time of one volume of feed per volume of reactor per hour (1 v./v./hr.), using 1% by weight of aluminum chloride (based on total fed) as catalyst.

Example 2

A sample of the above polymerization product was stripped to 90 wt. percent concentration and diluted first to 65 wt. percent with an 80 wt. percent aromatic hydrocarbon fraction boiling 150 to 350° F. and then to 40 wt. percent with n-heptane. This solution was hydrogenated in a continuous unit at 400° F. and 500 p.s.i.g. with 1000 standard cubic feet of hydrogen per barrel of feed on a 5% palladium on alumina catalyst promoted with 0.5% acetic acid. At the end of the thirty-fourth day of operation the flow of resin feed was discontinued and benzene was substituted. At the end of a day the flow of benzene was halted and the flow of resin feed continued. The same treatment was accomplished at the end of the forty-first and forty-second days, except that n-heptane was substituted for the benzene at the end of the forty-first day. Samples of hydrogenated resin were taken periodically and the ratios of the color of the product to the color of the feed were determined. The following results were obtained:

| Days of operation on feed | Color of product/color of feed | V./v./hr. |
|---|---|---|
| 28 | 0.046 | 1 |
| 31 | 0.091 | 2 |
| 33 | 0.134 | 1 |
| 34 | 0.233 | 1 |
| (1) | | |
| 35 | 0.040 | 1 |
| 36 | 0.049 | 2 |
| 39 | 0.099 | 2 |
| 40 | 0.100 | 2 |
| 41 | 0.105 | 2 |
| (2) | | |
| 42 | 0.133 | 2 |
| (3) | | |
| 43 | 0.059 | 2 |

[1] Washed 22 hrs. with benzene in 2 v./v./hr.
[2] Washed overnight with heptane in 2 v./v./hr.
[3] Washed overnight with benzene in 2 v./v./hr.

The above data show that the catalyst gradually declines in activity as evidenced by the gradual increase in color ratios of the product. At the end of the 35th day of operation the catalyst was washed with benzene as a result of which the color ratio was reduced from 0.233 to 0.040 showing that the catalyst activity had been restored. A similar attempt to restore activity at the end of the 41st day with n-heptane failed to restore activity as evidenced by the fact that the color ratio of the product was 0.105 before treatment and 0.133 after treatment—an actual increase. When benzene was substituted for the n-heptane the next day the catalyst activity was restored as shown by a reduction in color ratio of 0.059. These data clearly show the remarkable advantages of the method of this invention in reactivating the catalyst by periodic washing with an aromatic hydrocarbon.

Example 3

A sample of the polymerization product of Example 1 was stripped to 90 wt. percent concentration and diluted first to 65 wt. percent concentration with an 80 wt. percent aromatic hydrocarbon fraction boiling 150° to 350° F. and then to 40 wt. percent concentration with n-heptane. This solution was hydrogenated in a continuous unit at 400° F. and 1000 p.s.i.g. with 200 to 700 standard cubic feet per barrel of feed on a nickel sulfide catalyst at a flow rate of 1 v./v./hr. Color determinations were made periodically on an electrophotometer calibrated so that readings of 4–5 equal about one Gardner color. After the fourteenth day the feed flow was interrupted and the catalyst washed with xylene for twenty-four hours in the presence of hydrogen. The feed flow was then resumed and after the twentieth day the catalyst was again washed with xylene, this time in the absence of hydrogen. The following data were obtained.

| Days on stream | Color (electrophotometric readings) |
|---|---|
| 12 | 3.8 |
| 13 | 5.3 |
| 14 | 7.5 |
| (1) | |
| 15 | 4.7 |
| 16 | 5.6 |
| 19 | 9.4 |
| 20 | 10.4 |
| (2) | |
| 21 | 6.8 |
| 22 | 8.6 |

[1] Washed twenty-four hours with xylene.
[2] Washed twenty-two hours with xylene.

The above data show that nickel sulfide catalyst can be regenerated and that the presence or absence of hydrogen makes little difference.

Example 4

A sample of the polymerization product of Example 1 was diluted to 40 wt. percent concentration as in Examples 2 and 3 and hydrogenated at 440° F. over nickel catalyst at a flow rate of 1 v./v./hr. under 1000 p.s.i.g. using 1000 standard cubic feet of hydrogen per barrel of feed. Color determinations were made periodically and the catalyst was regenerated with benzene after the thirty-eighth day and with xylene after the forty-seventh day as described in Examples 2 and 3. The following data were obtained.

| Days on stream: | Color (electrophotometric readings) |
|---|---|
| 32 | 3.3 |
| 33 | 3.9 |
| 34 | 4.7 |
| 35 | 4.6 |
| 36 | 5.6 |
| 38 | 7.6 |
| (1) | |
| 39 | 2.4 |
| 40 | 3.2 |
| 44 | 6.0 |
| 45 | 6.6 |
| 46 | 7.6 |
| 47 | 7.9 |
| (2) | |
| 48 | 2.4 |

[1] Washed 2 v./v./hr. with benzene.
[2] Washed with xylene.

The advantages of the present invention having thus been fully set forth and specific examples of the same given, what is claimed as new and useful and desired to be secured by Letters Patent is:

1. In a method for preparing a low-colored resin in which a steam-cracked naphtha fraction is polymerized in the presence of a Friedel-Crafts catalyst at a temperature of −150 to +200° F. to form a highly colored resin and in which the highly colored resin solution is hydrogenated by dissolving it in an aliphatic hydrocarbon solvent and passing it over a hydrogenation catalyst at a temperature between 100 and 750° F. and under pressure at a flow rate between 0.1 and 5 volumes of resin solution per volume of catalyst per hour to form a low-colored resin and in which the catalyst gradually loses activity, the improvement which comprises restoring the catalyst activity by periodically discontinuing the flow of resin solution over the catalyst and instead contacting the catalyst while maintaining the other conditions substantially constant with an aromatic hydrocarbon until the catalyst activity has been restored, stopping the flow of aromatic hydrocarbon and continuing the flow of resin solution.

2. Process according to claim 1 in which the aliphatic hydrocarbon is n-heptane and the aromatic hydrocarbon is benzene.

3. Process according to claim 2 in which the catalyst is washed with the aromatic hydrocarbon in the absence of hydrogen.

4. Process according to claim 2 in which the catalyst is washed with the aromatic hydrocarbon in the presence of hydrogen.

5. Process according to claim 2 in which the washing with benzene is carried out in the absence of hydrogen.

6. Process according to claim 2 in which the aliphatic hydrocarbon is n-heptane and the aromatic hydrocarbon is xylene.

References Cited

UNITED STATES PATENTS

| 1,362,122 | 12/1919 | Vis | 252—414 |
| 1,431,982 | 10/1922 | Richter et al. | 252—414 |
| 2,150,641 | 3/1939 | Thomas et al. | 260—82 |
| 2,159,140 | 5/1939 | Eckell et al. | 252—414 |
| 2,238,726 | 2/1941 | Feisst et al. | 252—414 |
| 2,824,860 | 2/1958 | Aldridge et al. | 260—82 |
| 2,911,395 | 11/1959 | Small | 260—82 |
| 2,925,391 | 2/1960 | Lait et al. | 252—414 |
| 2,963,467 | 12/1960 | Small | 260—82 |
| 3,040,009 | 6/1962 | Wadsworth et al. | 260—82 |

FOREIGN PATENTS 591,929  2/1960  Canada.

JOSEPH L. SCHOFER, *Primary Examiner.*

J. C. HAIGHT, *Assistant Examiner.*